United States Patent
Mori et al.

(10) Patent No.: US 12,106,773 B2
(45) Date of Patent: Oct. 1, 2024

(54) MAGNETIC DISK DEVICE AND CONTROL METHOD

(71) Applicants: Kabushiki Kaisha Toshiba, Tokyo (JP); Toshiba Electronic Devices & Storage Corporation, Tokyo (JP)

(72) Inventors: Takuya Mori, Kanagawa (JP); Tetsuo Kuribayashi, Kanagawa (JP); Kazuo Chokki, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/181,961

(22) Filed: Mar. 10, 2023

(65) Prior Publication Data

US 2024/0062784 A1 Feb. 22, 2024

(30) Foreign Application Priority Data

Aug. 19, 2022 (JP) ................. 2022-130852

(51) Int. Cl.
G11B 20/18 (2006.01)
G11B 5/012 (2006.01)
G11B 19/04 (2006.01)

(52) U.S. Cl.
CPC ............ *G11B 19/045* (2013.01); *G11B 5/012* (2013.01); *G11B 2220/2516* (2013.01)

(58) Field of Classification Search
CPC ......... G11B 19/045; G11B 5/02; G11B 5/012; G11B 20/18; G11B 20/10009; G11B 5/09; G11B 5/00
USPC ........................................ 360/60, 53, 48, 75
See application file for complete search history.

(56) References Cited

U.S. PATENT DOCUMENTS

| 7,080,200 B2 | 7/2006 | Hassner et al. |
| 2014/0022661 A1 | 1/2014 | Sugawara |
| 2019/0287566 A1* | 9/2019 | Sato .................... G11B 5/02 |

FOREIGN PATENT DOCUMENTS

| JP | 2014-022021 A | 2/2014 |
| JP | 2019-160376 A | 9/2019 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a memory and a controller. The memory stores, for a predetermined track on a magnetic disk in the device, a counter, a counter threshold, and weights. The weights are individually set for divided areas of the predetermined track. The weights each have magnitude inversely proportional to a guaranteed number of times of data readout. When writing to an adjacent track of one or more of the divided areas is executed, the controller multiplies a number of times of writing by the weight corresponding to the one or more of the divided areas and adds the number of times of writing to the counter. When a numerical value of the counter reaches the counter threshold, the controller executes refresh to rewrite data in the predetermined track or executes reading for determining whether or not to perform the refresh.

12 Claims, 11 Drawing Sheets

MAGNETIC DISK DEVICE AND CONTROL METHOD

CROSS-REFERENCE TO RELATED APPLICATIONS

This application is based upon and claims the benefit of priority from Japanese Patent Application No. 2022-130852, filed on Aug. 19, 2022, the entire contents of which are incorporated herein by reference.

FIELD

Embodiments described herein relate generally to a magnetic disk device and a control method.

BACKGROUND

Adjacent track interference (ATI) is known as one of influences on an adjacent track when writing to a magnetic disk is performed.

The influence of the ATI on the adjacent track accumulates in accordance with the number of writing for one track, and the data of the adjacent track eventually becomes difficult to read. As a countermeasure against this issue, there is a technology of executing refresh (rewrite) of all data with respect to an adjacent track before, for example, becoming difficult to read data of the adjacent track, namely, when the number of times of writing to the track reaches a threshold value.

However, refreshing more than necessary deteriorates performance of a magnetic disk device. Moreover, due to variations in thickness of a magnetic film for each area on a surface of a magnetic disk, and the like, characteristics of falling under the influence of ATI (hereinafter, referred to as an "adjacent track interference characteristic") may differ from area to area located in a circumferential direction, even in a single track. Therefore, in the related art in which the number of times of writing is uniformly counted and compared with a threshold value regardless of area in a single track where data is written, refresh occurs more than necessary.

DETAILED DESCRIPTION

According to the present disclosure, a magnetic disk device and a control method capable of suppressing the frequency of occurrence of refresh are provided.

Hereinafter, embodiments (first to third embodiments) of a magnetic disk device and a control method of the present invention will be described in detail with reference to the accompanying drawings. Note that the technical scope of the present disclosure is not limited to those embodiments.

Figure 1:
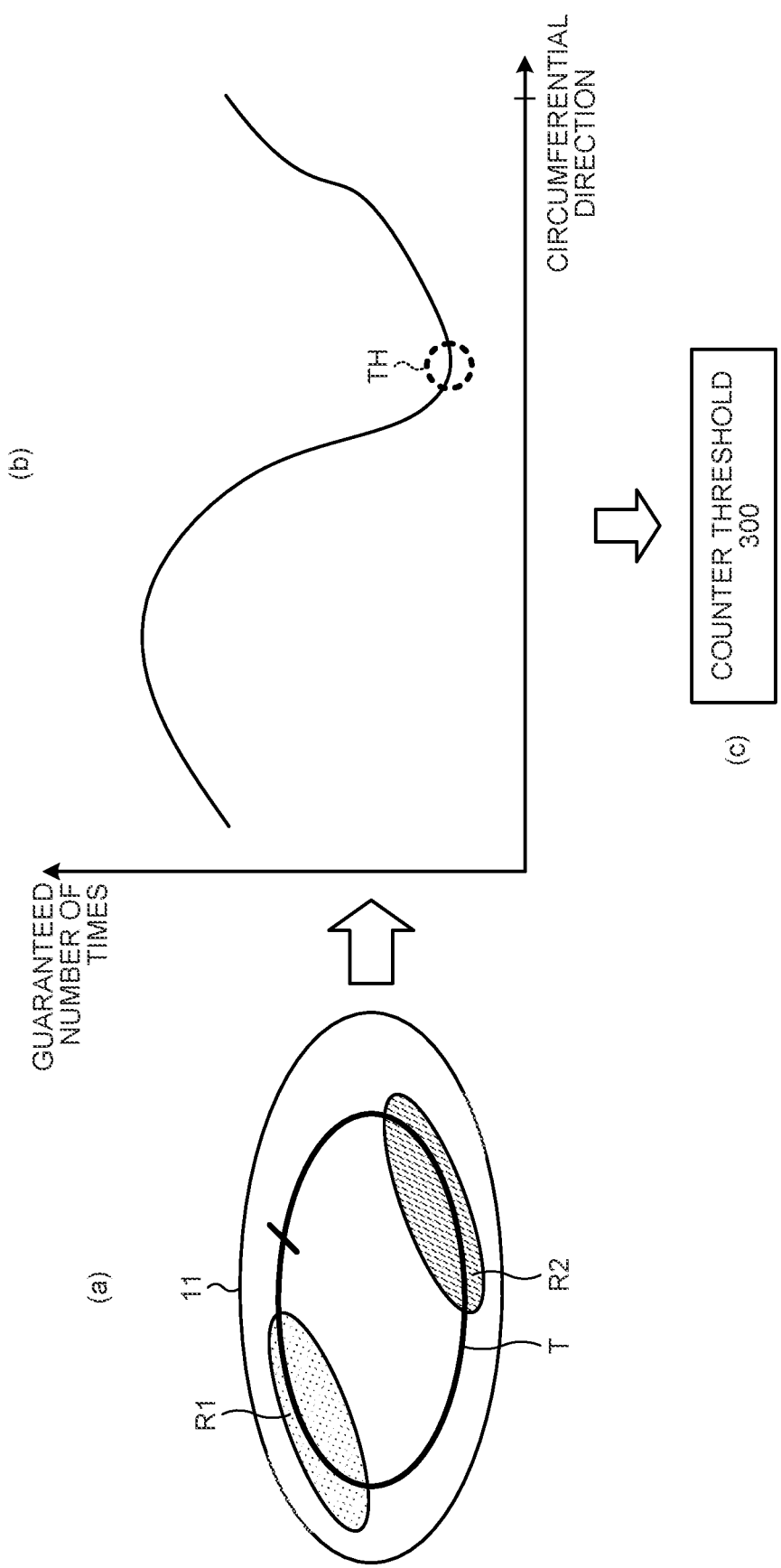
FIG. 1 is an explanatory diagram of determination using a counter threshold based on the guaranteed number of times in the related art.

For a better understanding of the embodiments, the related art will be described again. FIG. 1 is an explanatory diagram of determination using a counter threshold based on the guaranteed number of times in the related art. As known in the art, for preventing data loss, the ATI countermeasure function restores an influence of side erasing or the like, which occurs due to a data write operation onto a magnetic disk, by rewriting (refreshing) data.

Moreover, as described above, due to variations in thickness of the magnetic film for each area of a surface of the magnetic disk, adjacent track interference characteristics may be different from area to area located in the circumferential direction, even in a single track. Therefore, for example, even in a track T depicted in an illustration (a) of FIG. 1, the adjacent track interference characteristics may be different from area to area located in the circumferential direction. For example, in the illustration (a) of FIG. 1, a magnetic disk 11 includes a high guaranteed number of times area R1 and a low guaranteed number of times area R2. Note that information such as the high guaranteed number of times area R1 and the low guaranteed number of times area R2 is determined by, for example, inspection of the magnetic disk 11 at a factory, and is stored in a predetermined storage device.

The guaranteed number of times refers to the number of times of writing to an adjacent track, which ensures that data can be read (read out) from a target track. The guaranteed number of times is set to, for example, 50% or 20% of an upper limit value (a limit value) of the number of times of writing to the adjacent track.

In addition, in the ATI countermeasure function, the number of times of writing to the magnetic disk 11 is monitored by a counter. In the ATI countermeasure function, a counter threshold is set on the basis of the guaranteed number of times. The track in a range managed by each counter is refreshed (rewritten) when the number of times of writing reaches a counter threshold. Alternatively, when the number of times of writing reaches a counter threshold, reading for determining whether or not to perform refresh may be performed. In this case, the refresh is performed, as a result of performing the reading, in response to detecting an error or detecting that an error correction amount is large. On the other hand, when no error is detected or the error correction amount is small as a result of performing the reading, the refresh is not executed. In either case, counter clearing is executed. Hereinafter, in order to simplify the description, a case where refresh is performed when the number of times of writing reaches a counter threshold will be mainly described as an example.

A counter threshold is set on the basis of the guaranteed number of times of the worst area in the entire circumference of the track on a surface of the magnetic disk 11. Moreover, an increment amount to the count at the time of writing is not a constant value, but may be determined in consideration of influences such as a temperature and an off-track amount. Note that, however, the increment amount of the count is constant at every writing positions in the circumferential direction.

For example, as illustrated in a graph (b) in FIG. 1, the guaranteed number of times is different from area to area in the circumferential direction in one track. In this case, a counter threshold is set on the basis of the smallest guaranteed number of times (symbol TH). Assuming that the smallest guaranteed number of times is, for example, 300 times, "300" is set as a counter threshold, as depicted in an illustration (c) in FIG. 1. Then, each time the writing to the adjacent track is executed, the counter is incremented (1 is added), and refresh is executed when the value of the counter reaches 300 times as the counter threshold.

However, refreshing more than necessary deteriorates performance of a magnetic disk device. In the related art in which the number of times of writing is uniformly counted and compared with a counter threshold regardless of area in a single track where data is written, there is a problem that refresh occurs more than necessary.

Considering the above issue, a technology will be described, in which a track is divided into two or more divided areas on the basis of the guaranteed number of times that corresponds to the adjacent track interference characteristic in the circumferential direction of the track. Additionally, weighting for each area and addition to a counter are performed, or plural counters are used, whereby the frequency of occurrence of refresh can be suppressed while sufficiently exhibiting the ATI countermeasure function.

First Embodiment

A first embodiment will be described. Note that, in the following description, the "number of times of writing" is not limited to the literally number of times of writing. The "number of times of writing" may be a total value of values weighted by various parameters such as the following (1) to (4) for each head with respect to the write.
(1) Radial position
(2) Temperature
(3) Distance from write track (for example, number of tracks)

In inspection or the like on a magnetic disk 11 (details will be described later) performed in advance, a weight corresponding to a distance from a write track is created on the basis of a measurement result of an influence of ATI on an adjacent track related to the write track. The weight is stored in a system (storage unit) as a counter increment profile.
(4) Deviation amount from ideal writing position in track In the inspection or the like of the magnetic disk 11 performed in advance, on the basis of the measurement result of the influence of the ATI for each deviation amount from an ideal writing position (usually a center of the track) at the time of writing, a weight corresponding to the deviation amount is created and stored in the system (storage unit) as a counter increment profile.

Figure 2:
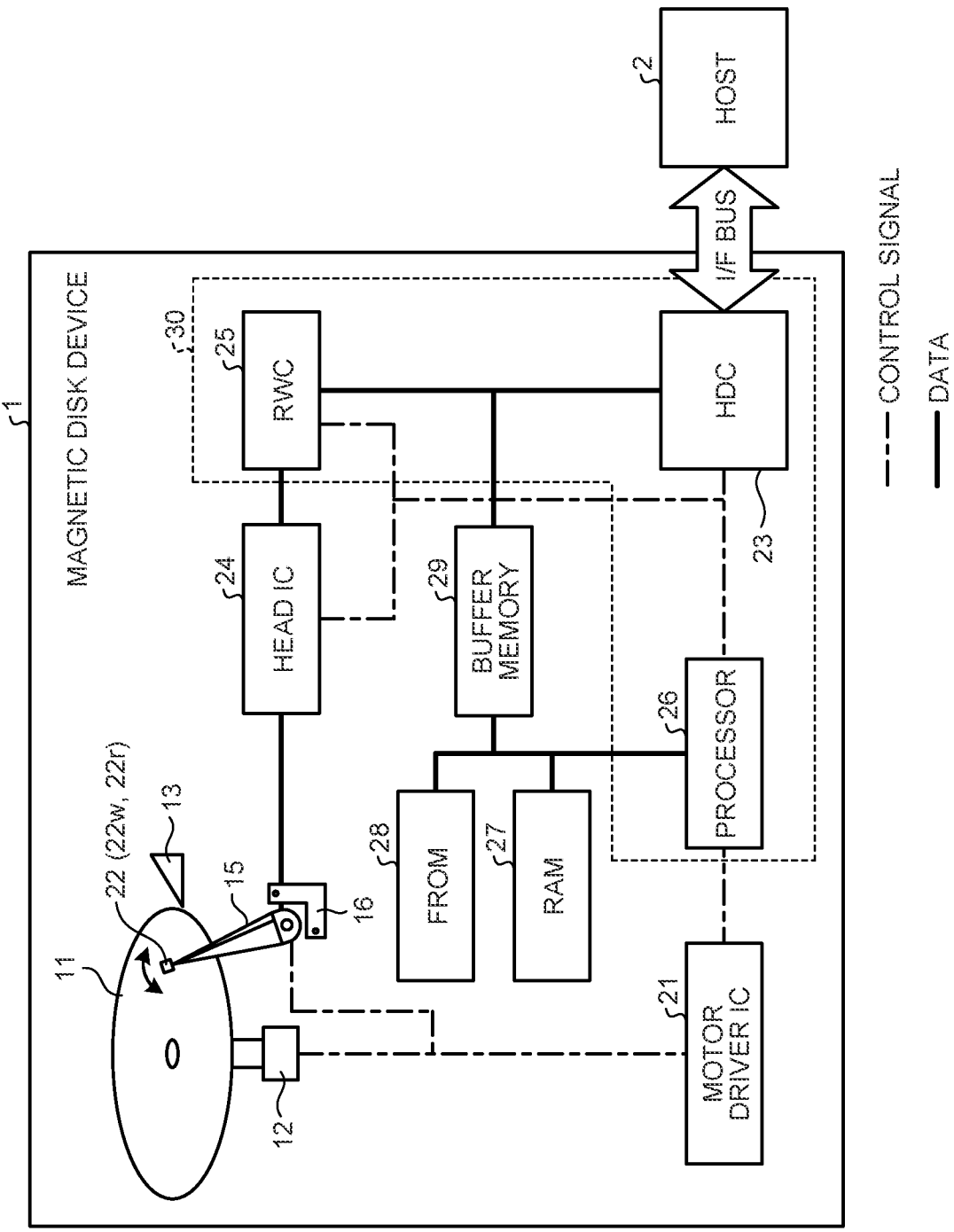
FIG. 2 is a diagram schematically illustrating a configuration of a magnetic disk device according to a first embodiment.

FIG. 2 is a diagram schematically illustrating a configuration of a magnetic disk device 1 of the first embodiment. The magnetic disk device 1 is connected to a host 2. The magnetic disk device 1 receives an access command such as a write command or a read command from the host 2.

The magnetic disk device 1 includes the magnetic disk 11. On a surface of the magnetic disk 11, a magnetic film is provided, and plural tracks are provided. The magnetic disk device 1 writes data to the magnetic disk 11 or reads data from the magnetic disk 11 in accordance with the access command from the host 2.

Data is written and read via a magnetic head 22. In addition to the magnetic disk 11, the magnetic disk device 1 includes a spindle motor 12, a lamp 13, an actuator arm 15, a voice coil motor (VCM) 16, a motor driver integrated circuit (IC) 21, the magnetic head 22, a hard disk controller (HDC) 23, a head IC 24, a read/write channel (RWC) 25, a processor 26, a RAM 27, a flash read only memory (FROM) 28, and a buffer memory 29.

The magnetic disk 11 is rotated at a predetermined rotation speed by the spindle motor 12 attached coaxially. The spindle motor 12 is driven by the motor driver IC 21.

The processor 26 controls, via the motor driver IC 21, the rotation of the spindle motor 12 and the rotation of the VCM 16.

The magnetic head 22 reads/writes data from/to the tracks of the magnetic disk 11. That is, the magnetic head 22 writes and reads information to and from the magnetic disk 11 by a write core 22w and a read core 22r provided in the magnetic head 22. The magnetic head 22 is attached to a distal end of the actuator arm 15. The magnetic head 22 is moved in a radial direction of the magnetic disk 11 by the VCM 16. Note that either one or both of write cores 22w and read cores 22r may each be provided more than one for a single magnetic head 22.

The magnetic head 22 is moved onto the lamp 13 when, for example, the rotation of the magnetic disk 11 is stopped. The lamp 13 is configured to hold the magnetic head 22 at a position spaced apart from the magnetic disk 11.

In a read operation, the head IC 24 amplifies and outputs a signal read by the magnetic head 22 from the magnetic disk 11 to supply the signal to the RWC 25. Moreover, in a write operation, the head IC 24 amplifies a signal indicating data to be written, which is supplied by the RWC 25, and supplies the amplified signal to the magnetic head 22.

The HDC 23 controls transmission and reception of data performed with the host 2 via an OF bus, and also controls the buffer memory 29.

The buffer memory 29 is used as a buffer for storing data transmitted to and received from the host 2. For example, the buffer memory 29 temporarily stores data to be written or data read from the magnetic disk 11.

The buffer memory 29 is configured by a volatile memory capable of high-speed operation. The type of the memory constituting the buffer memory 29 is not limited to a specific type of memory. The buffer memory 29 may be configured by, for example, a dynamic random access memory (DRAM), a static random access memory (SRAM), or a combination thereof. Note that the buffer memory 29 may be configured by an optional non-volatile memory.

The RWC 25 performs modulation, such as error correction coding, on data to be written supplied from the HDC 23, and supplies the modulated data to the head IC 24. Moreover, the RWC 25 performs demodulation including error correction processing on a signal read from the magnetic disk 11 and supplied from the head IC 24, and outputs the demodulated signal as digital data to the HDC 23.

The processor 26 is, for example, a central processing unit (CPU). The RAM 27, the FROM 28, and the buffer memory 29 are connected to the processor 26.

The FROM 28 is a nonvolatile memory. The FROM 28 stores firmware (program data), various operation parameters, and the like. Note that the firmware may be stored in the magnetic disk 11.

The RAM 27 includes, for example, a DRAM, an SRAM, or a combination thereof. The RAM 27 is used as an operation memory for the processor 26. The RAM 27 is used as a region where firmware is loaded and a region where various types of management data are temporarily stored.

The processor 26 performs overall control of the magnetic disk device 1 in accordance with the firmware stored in the FROM 28 or the magnetic disk 11. For example, the processor 26 loads the firmware from the FROM 28 or the magnetic disk 11 to the RAM 27, and executes control of the motor driver IC 21, the head IC 24, the RWC 25, the HDC 23, and the like in accordance with the loaded firmware.

The configuration including the HDC 23, the RWC 25, and the processor 26 can be regarded as a controller 30 that controls the operation of the magnetic disk device 1. In addition to these components, the controller 30 may include other components (for example, the RAM 27, the FROM 28, the buffer memory 29, or the like).

Figure 3:
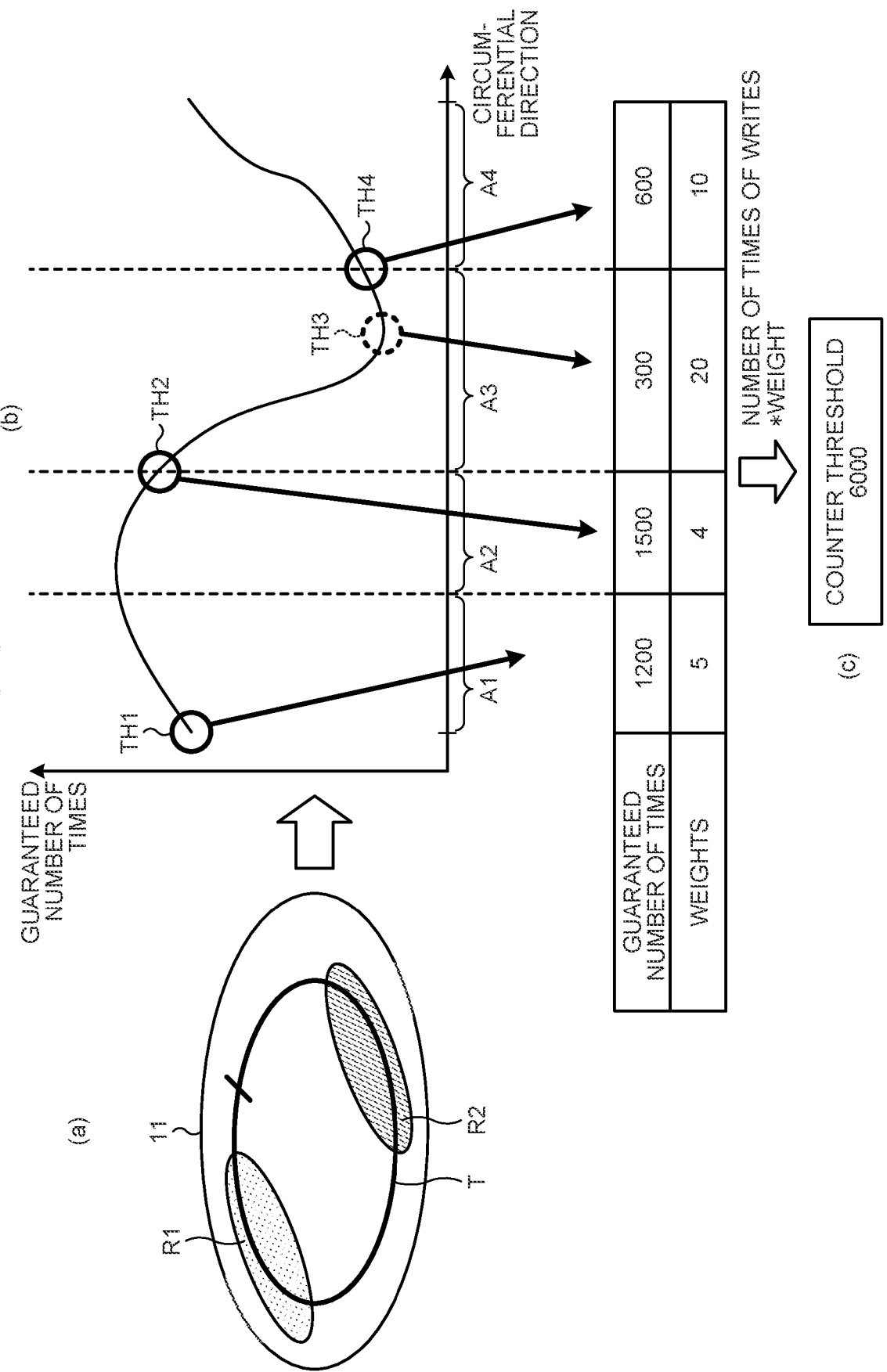
FIG. 3 is an explanatory diagram of determination using the guaranteed number of times and a weight according to the first embodiment.
Figure 4:
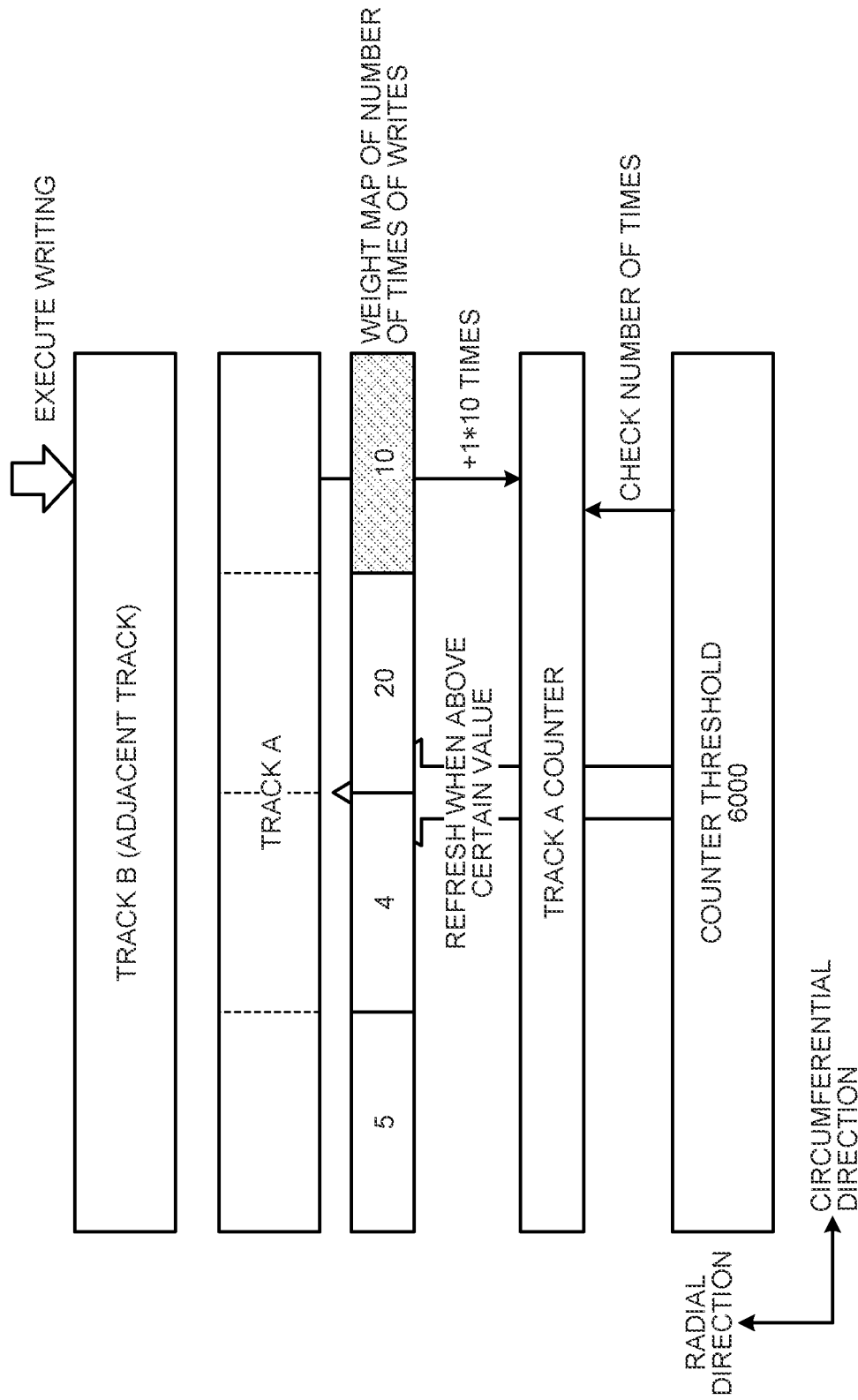
FIG. 4 is an explanatory diagram of determination using the guaranteed number of times and the weight according to the first embodiment.

Hereinafter, FIGS. 3 and 4 will also be referred to. FIGS. 3 and 4 are explanatory diagrams of determination using the guaranteed number of times and a weight according to the first embodiment. An illustration (a) in FIG. 3 is similar to the illustration (a) in FIG. 1. Moreover, as depicted in a graph (b) in FIG. 3, the entire area of one track is divided into four areas A1 to A4 in the circumferential direction. In each of the divided areas A1 to A4, the smallest guaranteed number of times (a corresponding one of TH1 to TH4) is adopted.

Moreover, as depicted in a table in (b) of FIG. 3, a weight with magnitude inversely proportional to the guaranteed number of times is set for each of the divided areas A1 to A4. Moreover, as depicted in an illustration (c) in FIG. 3, a counter threshold is set to 6000 times. Then, as also illustrated in FIG. 4, at the time of executing writing to the adjacent track (a track B), the number of times of writing is multiplied by the weight of the corresponding area and then added to the counter. When the value of the counter reaches 6000 times as the counter threshold, refresh is executed, or reading for determining whether or not to perform the refresh is executed.

For such an operation, the storage unit (such as the RAM 27) stores, for a predetermined track out of the tracks in the magnetic disk 11, a counter for storing a numerical value, a counter threshold, and weights that are individually set for divided areas A1 to A4 of the predetermined track. Each of the weights has magnitude that is inversely proportional to a guaranteed number of times of data readout. Each of these numerical values is determined by, for example, inspection of the magnetic disk 11 at the factory, and is stored in the storage unit, similarly to the information such as the high guaranteed number of times area R1 and the low guaranteed number of times area R2.

Then, when writing to the adjacent track of one or more of the divided areas A1 to A4 is executed, the controller 30 multiplies the number of times of writing by the weight corresponding to the corresponding area and then adds the number of writing to the counter. Moreover, when the numerical value of the counter reaches a counter threshold, the controller 30 executes refresh to rewrite data of the predetermined track (alternatively, executes reading for determining whether or not to perform the refresh).

The controller 30 divides the predetermined track into two or more divided areas on the basis of the guaranteed number of times corresponding to the adjacent track interference characteristic for each area of the magnetic disk 11. The track is divided such that, for example, a difference between the maximum value and the minimum value of the guaranteed number of times in each area is minimized. Specifically, for example, the track is first equally divided into eight areas, and then the eight areas are combined to form four areas in accordance with variation in the guaranteed number of times.

Moreover, in that case, a position of the magnetic disk 11 in the radial direction may be took into account. For example, in general, the guaranteed number of times tends to be larger on an inner side than on an outer side of the magnetic disk 11. Therefore, the number of divisions of the area may be differentiated between the inner side and the outer side, such as, for example, dividing the outer side of the magnetic disk 11 into six, while dividing the inner side into four.

Moreover, the controller 30 determines the magnitude of each weight on the basis of the guaranteed number of times corresponding to the adjacent track interference characteristic for each area of the magnetic disk 11. For example, as described above, the weight whose magnitude is inversely proportional to the minimum value of the guaranteed number of times is determined for each area.

Note that part of or all the functions of the processor 26 may be implemented by a hardware circuit such as a field-programmable gate array (FPGA) or an application specific integrated circuit (ASIC).

Moreover, the number of the magnetic disks 11 included in the magnetic disk device 1 is not limited to one. The magnetic disk device 1 may include actuator arms 15 and magnetic heads 22 in the number corresponding to the number of the magnetic disks 11. In a case where the magnetic disk device 1 includes two or more magnetic heads 22, the magnetic heads 22 may be integrally moved, or may constitute two or more groups that are independently movable.

Figure 5:
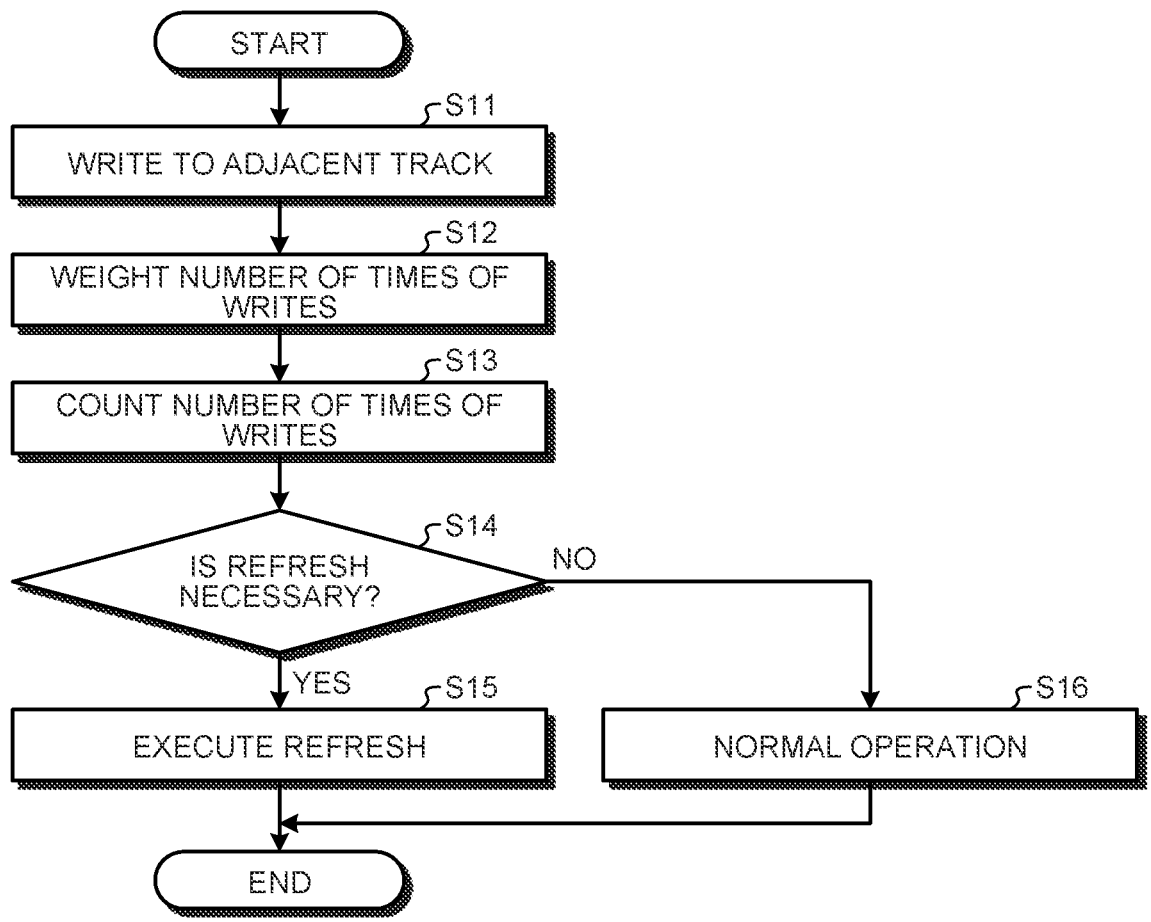
FIG. 5 is a flowchart illustrating processing by a controller according to the first embodiment.

FIG. 5 is a flowchart illustrating processing by the controller 30 according to the first embodiment. First, in step S11, the controller 30 detects writing (write) to the adjacent track.

Next, in step S12, the controller 30 determines a writing position in the circumferential direction. Additionally, the controller 30 makes reference to the storage unit and multiplies the number of times of writing by the weight of the corresponding area (such as the RAM 27).

Next, in step S13, the controller 30 adds the value calculated in step S12 to the counter.

Next, in step S14, the controller 30 determines whether or not refresh is necessary, that is, whether or not the numerical value of the counter has reached a counter threshold. The processing proceeds to step S15 in response to determining that the refresh is necessary (Yes in S14). The processing proceeds to step S16 in response to determining that the refresh is not necessary (No in S14).

In step S15, the controller 30 executes the refresh (alternatively, reading for determining whether or not to perform refresh) on the corresponding track. Thereafter, the processing proceeds to step S16.

In step S16, the controller 30 returns to the normal operation (read, write, etc.).

As described above, according to the magnetic disk device 1 of the first embodiment, a track is divided into two or more divided areas on the basis of the guaranteed number of times corresponding to the adjacent track interference characteristic in the circumferential direction of the track.

The number of times of writing for each divided area is counted after weighting and is compared with a counter threshold when writing to the adjacent track is executed. Therefore, the frequency of occurrence of refresh can be suppressed.

Moreover, the track is not simply divided into equal lengths but is divided on basis of the guaranteed number of times corresponding to the adjacent track interference characteristic for each area. Therefore, the frequency of occurrence of refresh can be further suppressed.

Second Embodiment

Next, a second embodiment will be described. Description of matters similar to those in the first embodiment will be omitted as appropriate. In the second embodiment, instead of weighting individual divided areas of a track and incrementing a counter as in the first embodiment, a counter (hereinafter, also referred to as a "division counter") is set for each of divided areas of a track and increment is individually performed on the division counters.

Figure 6:
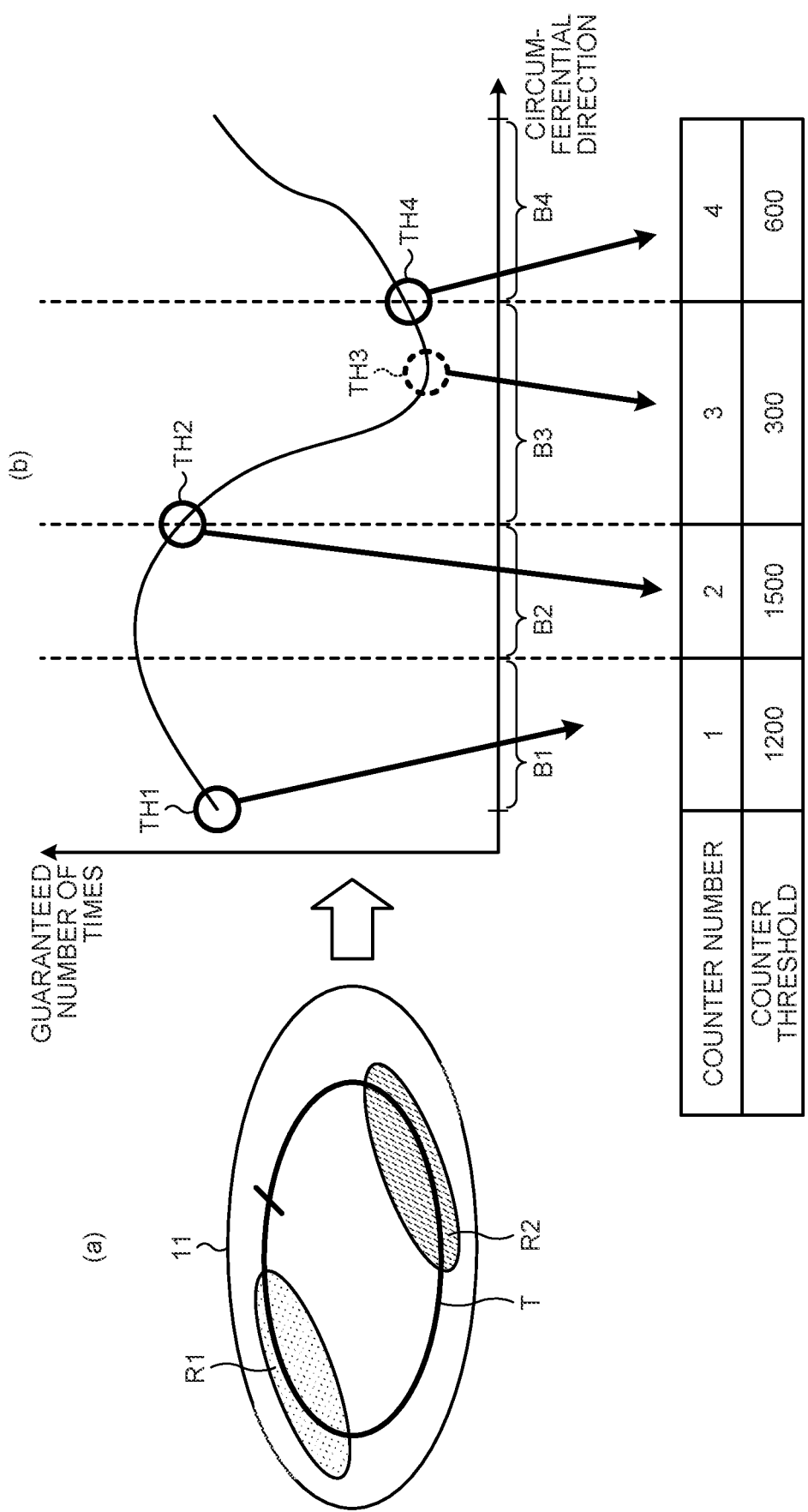
FIG. 6 is an explanatory diagram of determination using a counter threshold for each division counter according to a second embodiment.
Figure 7:
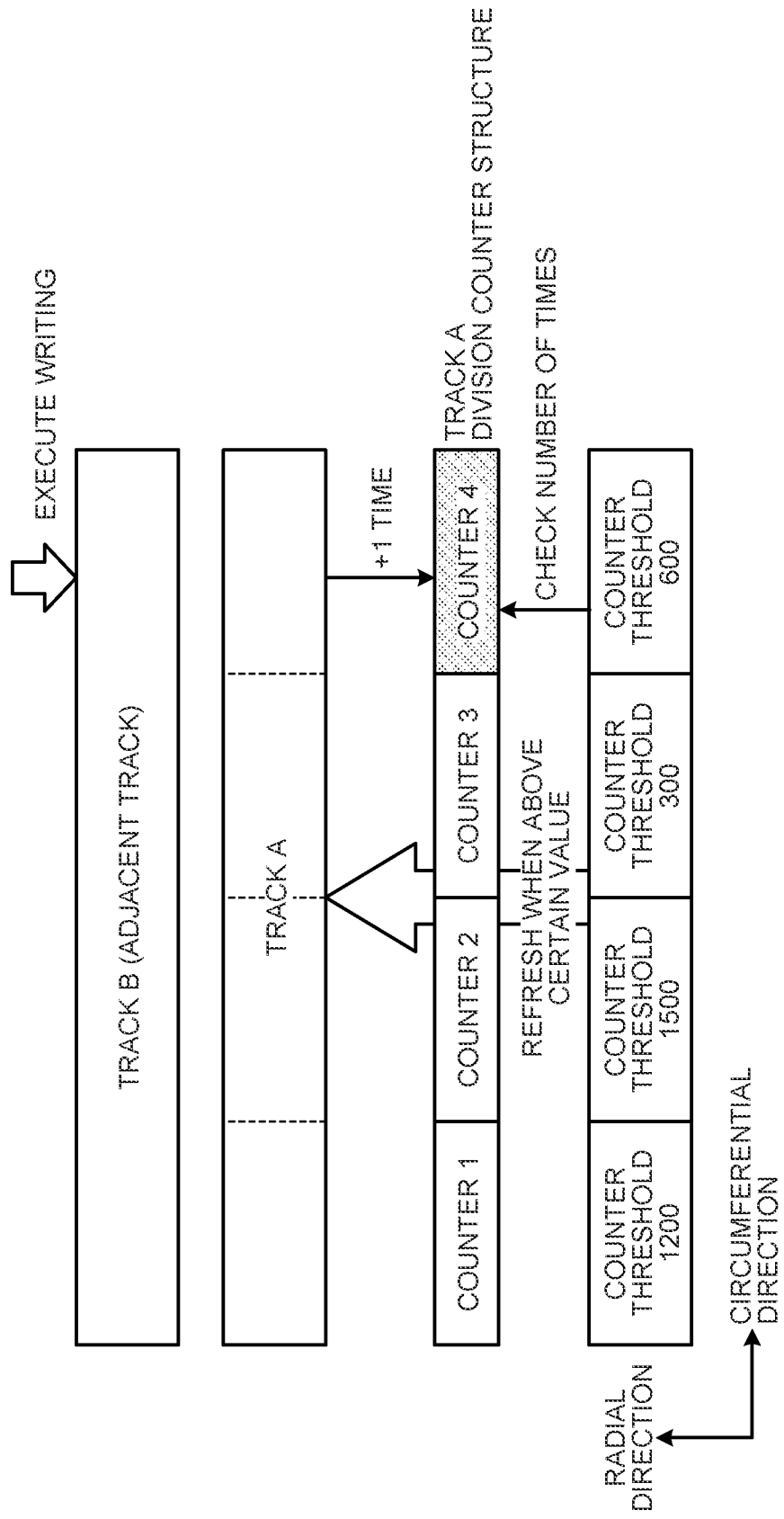
FIG. 7 is an explanatory diagram of determination using a counter threshold for each division counter according to the second embodiment.

FIGS. 6 and 7 are explanatory diagrams of determination using a counter threshold for each division counter according to the second embodiment. An illustration (a) in FIG. 6 is similar to the illustration (a) in FIG. 3.

Moreover, as depicted in a table in (b) of FIG. 6, the division counter and a counter threshold, which corresponds to the minimum value of the guaranteed number of times in the area, are set for each of the divided areas B1 to B4 of the target track (a track A). As also illustrated in FIG. 7, at the time of executing writing to the adjacent track (a track B), a division counter of the corresponding area in the target track is incremented (1 addition). Then, when the value of the division counter reaches the counter threshold for each area, refresh (alternatively, reading for determining whether or not to perform refresh) is executed.

For such an operation, the storage unit (the RAM 27, etc.) stores, for each of divided areas of a predetermined track out of tracks on the magnetic disk 11, a division counter for storing a numerical value, and a counter threshold of the division counter. The counter threshold is set on the basis of the guaranteed number of times corresponding to an adjacent track interference characteristic for each area. Each of these numerical values is determined by, for example, inspection of the magnetic disk 11 at a factory, and is stored in the storage unit.

Then, for each area, the controller 30 increments the counter when writing to an adjacent track is executed, and executes refresh (alternatively, reading for determining whether or not to perform refresh) to rewrite data when a numerical value of the counter reaches the counter threshold.

Figure 8:
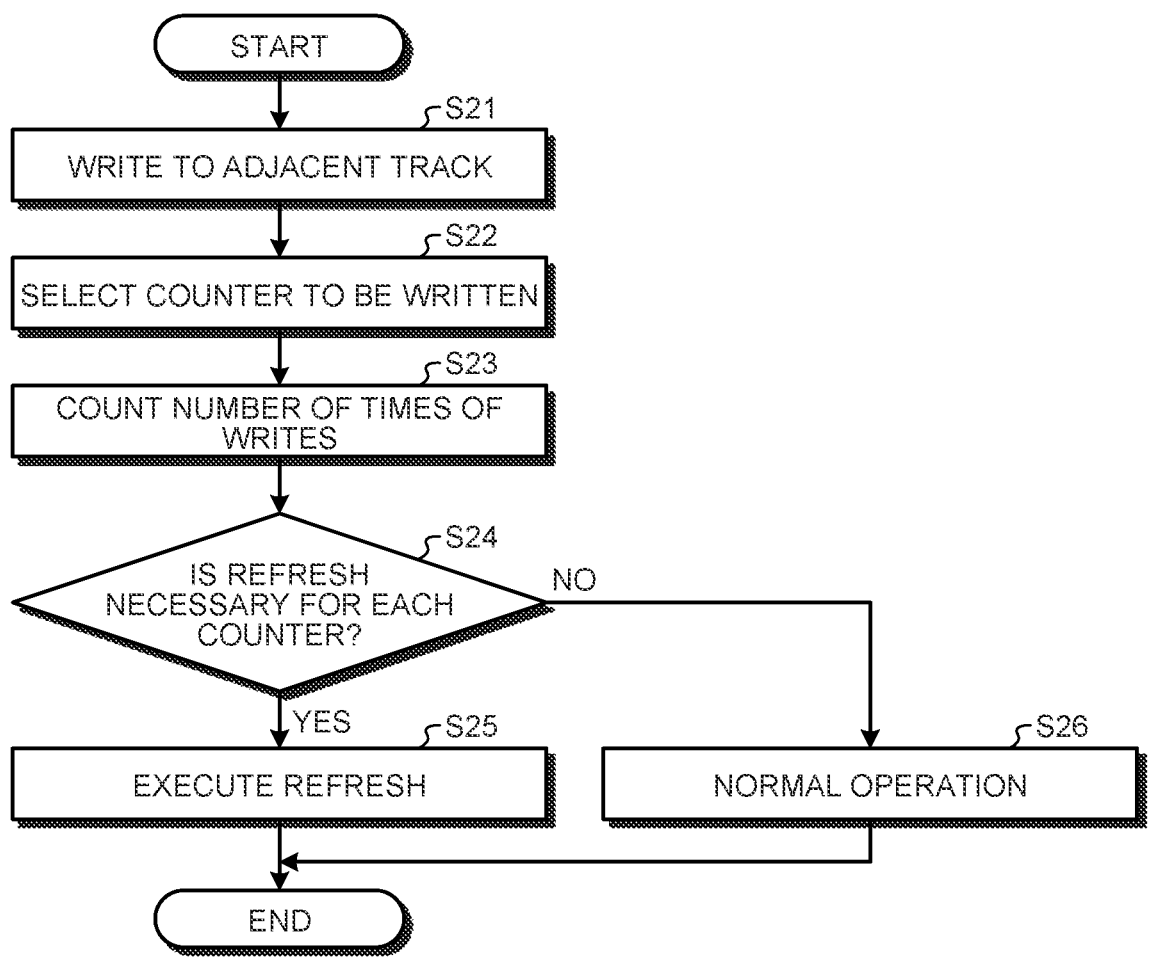
FIG. 8 is a flowchart illustrating processing by a controller according to the second embodiment.

FIG. 8 is a flowchart illustrating processing by the controller 30 according to the second embodiment. First, in step S21, the controller 30 detects writing (write) to the adjacent track.

Next, in step S22, the controller 30 determines a writing position in the circumferential direction. Additionally, the controller 30 makes reference to the storage unit (the RAM 27, etc.) and selects a division counter to be incremented.

Next, in step S23, the controller 30 increments (adds 1 to) the division counter selected in step S22.

Next, in step S24, the controller 30 determines whether or not refresh is necessary for each division counter, that is, whether or not the numerical value of each division counter has reached a counter threshold. The processing proceeds to step S25 in response to determining that the refresh is necessary (Yes in S24). The processing proceeds to step S26 in response to determining that the refresh is not necessary (No in S24).

In step S25, the controller 30 executes refresh (alternatively, reading for determining whether or not to perform refresh) on the corresponding area. Note that, in consideration of refresh efficiency, not only the corresponding area but also other areas may be refreshed together. Thereafter, the processing proceeds to step S26.

In step S26, the controller 30 returns to the normal operation (read, write, etc.).

As described above, according to the magnetic disk device 1 of the second embodiment, the track is divided into two or more divided areas on the basis of the guaranteed number of times corresponding to the adjacent track interference characteristic in the circumferential direction of the track. Then, for each divided area, the division counters and the counter threshold thereof are set and counted, whereby the frequency of occurrence of refresh can be suppressed.

Third Embodiment

Next, a third embodiment will be described. Description of matters similar to the first embodiment and/or the second embodiment will be omitted as appropriate. In the third embodiment, weighting as in the first embodiment is further applied to the second embodiment.

Figure 9:
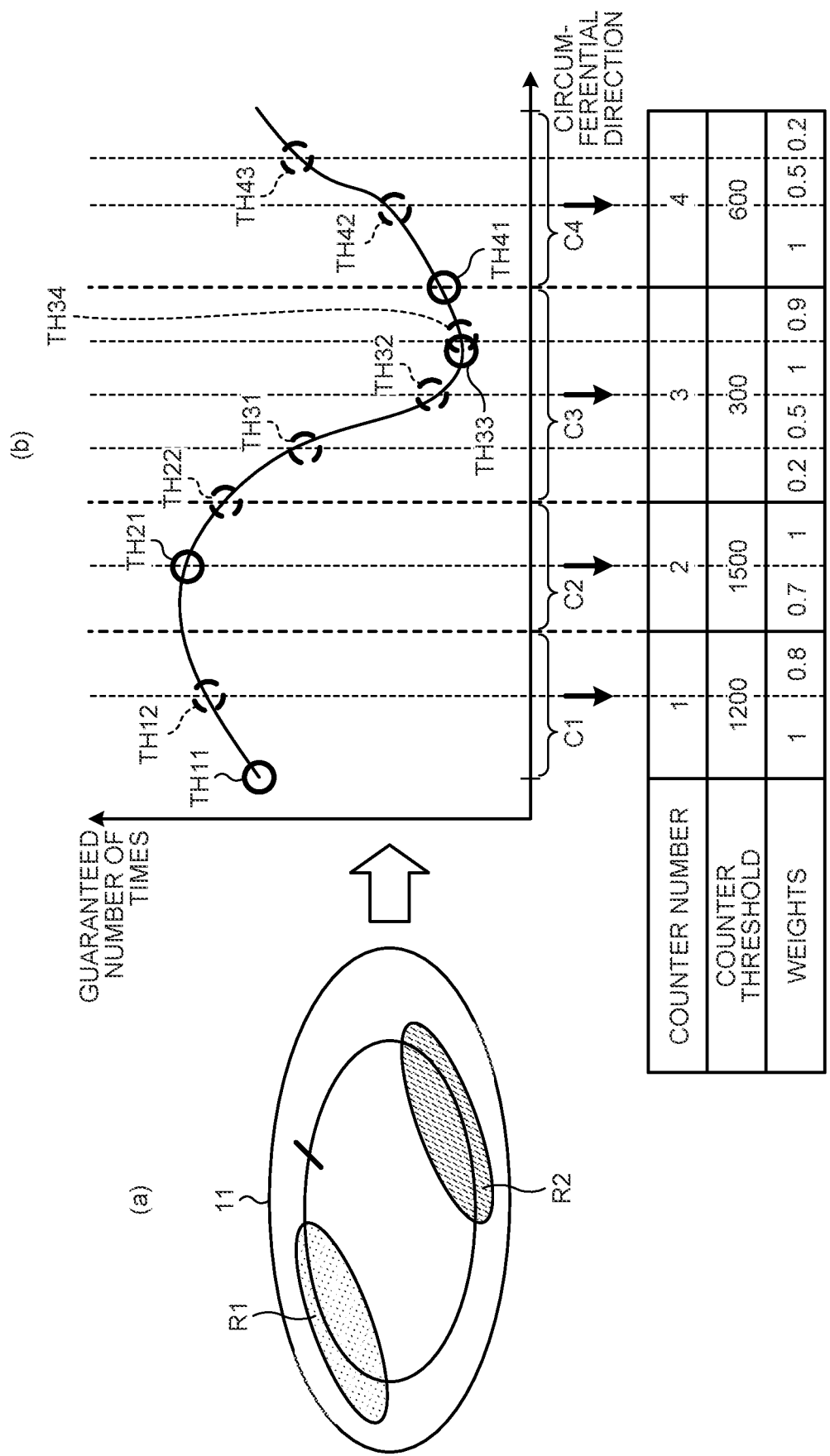
FIG. 9 is an explanatory diagram of determination using a counter threshold and a weight for each division counter according to a third embodiment.
Figure 10:
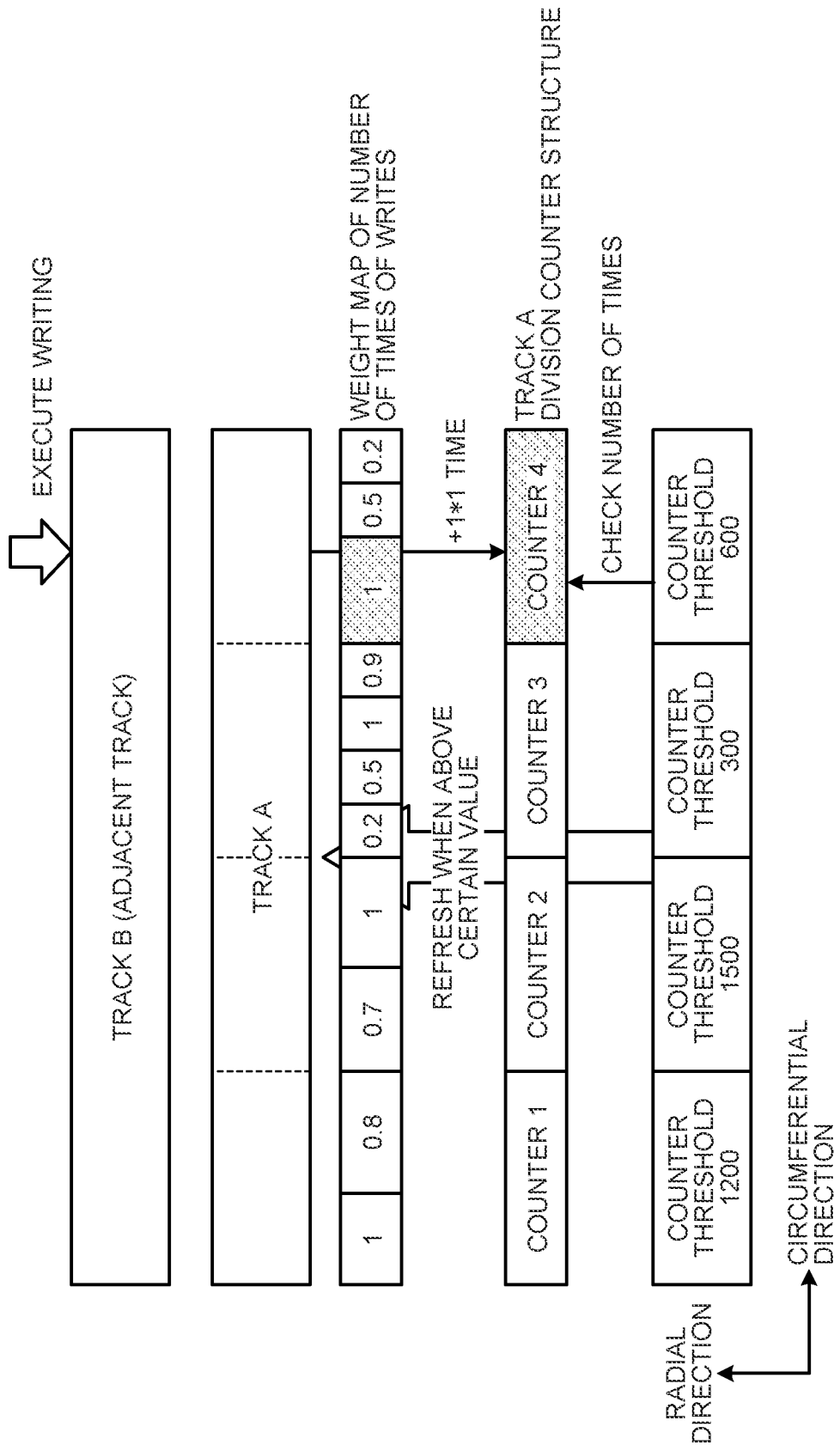
FIG. 10 is an explanatory diagram of determination using a counter threshold and the weight for each division counter according to the third embodiment.

FIGS. 9 and 10 are explanatory diagrams of determination using a counter threshold and a weight for each division counter according to the third embodiment. An illustration (a) in FIG. 9 is similar to the illustration (a) in FIG. 3.

Moreover, as depicted in a table in (b) of FIG. 9, the division counter and a counter threshold are set for each of divided areas C1 to C4.

For example, a counter threshold "1200" for the divided area C1 corresponds to the minimum value TH11 in the divided area C1.

Similarly, a counter threshold "1500" for the divided area C2 corresponds to the minimum value TH22 in the divided area C2.

A counter threshold "300" for the divided area C3 corresponds to the minimum value TH33 in the divided area C3.

A counter threshold "600" for the divided area C4 corresponds to the minimum value TH41 in the divided area C4.

Moreover, each of the divided areas C1 to C4 is subdivided into two or more subdivided areas. A weight having magnitude inversely proportional to the minimum value of the guaranteed number of times is set for each subdivided area.

For example, for two subdivided areas in the divided area C1, the respective weights are set to "1 (corresponding to the minimum value TH11 of the guaranteed number of times)" and "0.8 (corresponding to the minimum value TH12 of the guaranteed number of times)".

Similarly, the respective weights of two subdivided areas in the divided area C2 are set to "0.7 (corresponding to the minimum value TH21 of the guaranteed number of times)" and "1 (corresponding to the minimum value TH22 of the guaranteed number of times)".

The respective weights of four subdivided areas in the divided area C3 are set to "0.2 (corresponding to the minimum value TH31 of the guaranteed number of times)", "0.5 (corresponding to the minimum value TH32 of the guaranteed number of times)", "1 (corresponding to the minimum value TH33 of the guaranteed number of times)", and "0.9 (corresponding to the minimum value TH34 of the guaranteed number of times)".

Moreover, the respective weights of three subdivided areas in the divided area C4 are set to "1 (corresponding to the minimum value TH41 of the guaranteed number of times)", "0.5 (corresponding to the minimum value TH42 of the guaranteed number of times)", and "0.2 (corresponding to the minimum value TH43 of the guaranteed number of times)".

As also illustrated in FIG. 10, at the time of executing writing to the adjacent track (a track B), for the corresponding divided area of a target track (a track A), the number of times of writing is multiplied by the weight of the corresponding subdivided area and then added to the division counter. When the value of the counter reaches the counter threshold, refresh (alternatively, reading for determining whether or not to perform refresh) is executed.

For such an operation, the storage unit (the RAM 27, etc.) stores, for each divided area, weights to be applied to subdivided areas. The weights each have magnitude inversely proportional to the guaranteed number of times of data readout. Each of these numerical values is determined by, for example, inspection of the magnetic disk 11 at a factory, and is stored in the storage unit.

Then, for each divided area, when writing to an adjacent track of one or more of the subdivided areas is executed, the controller 30 multiplies the number of times of writing by a weight corresponding to the one or more subdivided areas and then adds the number of times of writing to the division counter. Moreover, the controller 30 executes refresh (alternatively, reading for determining whether or not to perform refresh) when the numerical value of the division counter reaches the counter threshold.

Figure 11:
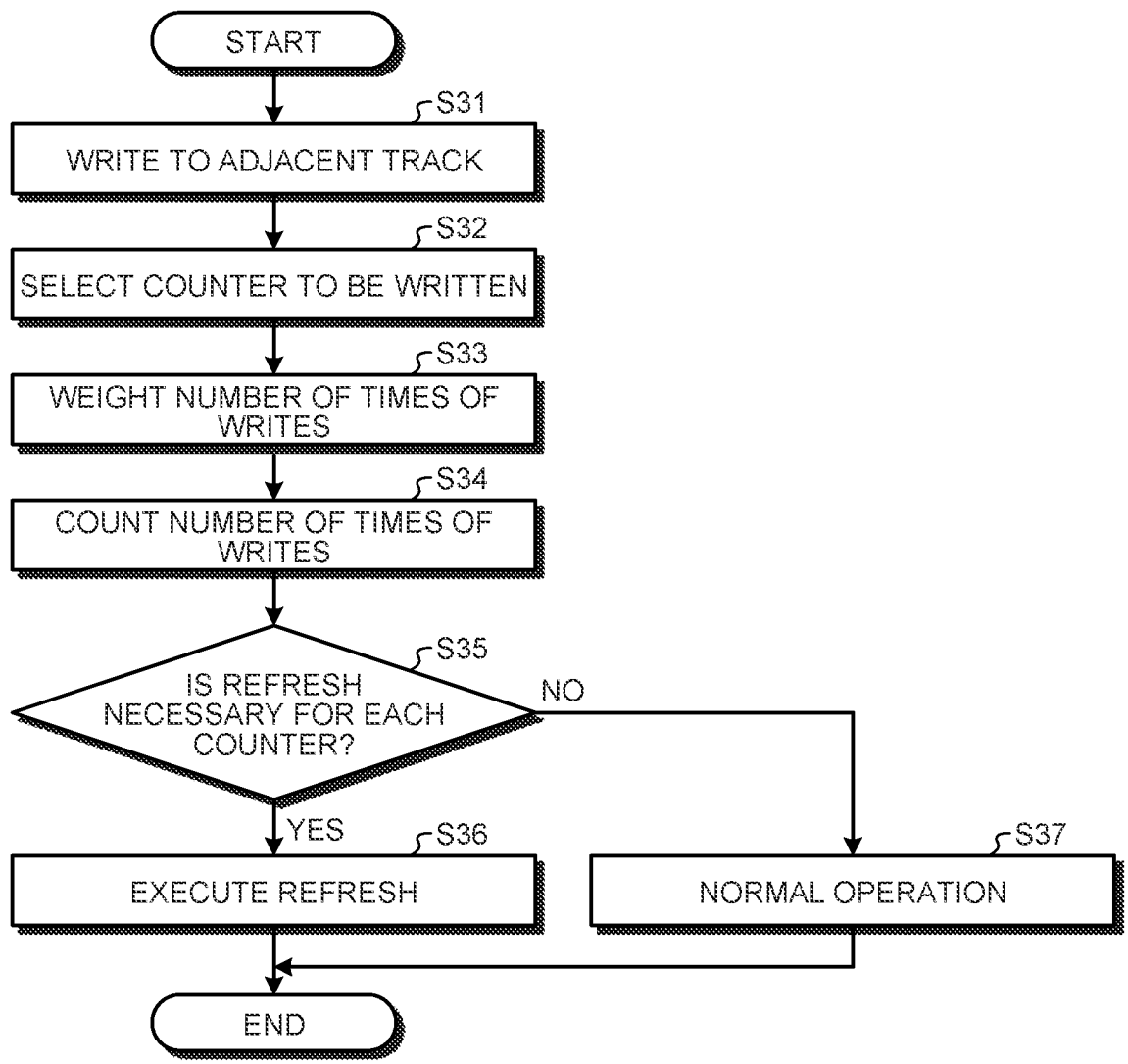
FIG. 11 is a flowchart illustrating processing by a controller according to the third embodiment.

FIG. 11 is a flowchart illustrating processing by the controller 30 according to the third embodiment. First, in step S31, the controller 30 detects writing (write) to the adjacent track.

Next, in step S32, the controller 30 determines a writing position in the circumferential direction. In addition, the controller 30 makes reference to the storage unit (the RAM 27, etc.) and selects a division counter to be incremented.

Next, in step S33, the controller 30 multiplies the number of times of writing by the weight of the corresponding subdivided area.

Next, in step S34, the controller 30 adds the value calculated in step S33 to the counter selected in step S32.

Next, in step S35, the controller 30 determines whether or not refresh is necessary for each division counter, that is, whether or not the numerical value of the division counter has reached a counter threshold. The processing proceeds to step S36 in response to determining that the refresh is necessary (Yes in S35), and the processing proceeds to step S37 in response to determining that the refresh is not necessary (No in S35).

In step S36, the controller 30 executes refresh (alternatively, reading for determining whether or not to perform refresh) on the corresponding area. Note that in consideration of refresh efficiency, not only the corresponding area but also other areas may be refreshed together. Thereafter, the processing proceeds to step S37.

In step S37, the controller 30 returns to the normal operation (read, write, etc.).

As described above, according to the magnetic disk device 1 of the third embodiment, a track is divided into two or more divided areas on the basis of the guaranteed number of times corresponding to the adjacent track interference characteristic in the circumferential direction of the track, and, for each divided area, a different counter threshold is set and counting is performed. Moreover, each divided area is further divided into two or more subdivided areas. A weight having magnitude inversely proportional to the guaranteed number of times is set for each subdivided area, and counting is performed by using the weight. As a result, the frequency of occurrence of refresh can be further suppressed.

While certain embodiments have been described, these embodiments have been presented by way of example only, and are not intended to limit the scope of the inventions. Indeed, the novel embodiments described herein may be embodied in a variety of other forms; moreover, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk on which tracks are provided;
a magnetic head configured to read/write data from/to the tracks;
a memory configured to store, for a predetermined track out of the tracks,
  a counter storing a numerical value,
  a counter threshold being a threshold value of the counter, and
  weights individually set for divided areas of the predetermined track, the weights each having magnitude inversely proportional to a guaranteed number of times of data readout; and
a controller configured to,
  when writing to an adjacent track of one or more of the divided areas is executed, multiply a number of times of writing by the weight corresponding to the one or more of the divided areas and add the number of times of writing to the counter, and,
  when a numerical value of the counter reaches the counter threshold, execute refresh to rewrite data in the predetermined track or execute reading for determining whether or not to perform the refresh.

2. A magnetic disk device comprising:
a magnetic disk on which tracks are provided;
a magnetic head configured to read/write data from/to the tracks;
a memory configured to store, for each of divided areas of a predetermined track out of the tracks,
  a counter storing a numerical value, and
  a counter threshold being a threshold value of the counter set on the basis of a guaranteed number of times of data readout, the guaranteed number of times corresponding to an adjacent track interference characteristic for each of the areas; and
a controller configured to, for each of the divided areas,
  increment the counter when writing to an adjacent track is executed, and,
  when a numerical value of the counter reaches the counter threshold, execute refresh to rewrite data or execute reading for determining whether or not to perform the refresh, wherein
the memory is configured to, for each of the divided areas, store weights individually set for subdivided areas of the corresponding divided area, the weights each having magnitude inversely proportional to a guaranteed number of times of data readout, and
the controller is configured to, for each of the divided areas, when writing to an adjacent track of one or more of the subdivided areas is executed, multiply a number of times of writing by the weight corresponding to the one or more of the subdivided areas and add the number of times of writing to the counter, and, when a numerical value of the counter reaches the counter threshold, execute the refresh or execute the reading for determining whether or not to perform the refresh.

3. The magnetic disk device according to claim 1, wherein the controller is configured to divide the predetermined track into the divided areas on the basis of a guaranteed number of times of data readout, the guaranteed number of times corresponding to an adjacent track interference characteristic for each area of the magnetic disk.

4. The magnetic disk device according to claim 2, wherein the controller is configured to divide the predetermined track into the divided areas on the basis of a guaranteed number of times of data readout, the guaranteed number of times corresponding to an adjacent track interference characteristic for each area of the magnetic disk.

5. The magnetic disk device according to claim 1, wherein the controller is configured to determine magnitude of each of the weights on the basis of a guaranteed number of times of data readout, the guaranteed number of times corresponding to an adjacent track interference characteristic for each area of the magnetic disk.

6. The magnetic disk device according to claim 2, wherein the controller is configured to determine magnitude of each of the weights on the basis of a guaranteed number of times of data readout, the guaranteed number of times corresponding to an adjacent track interference characteristic for each area of the magnetic disk.

7. The magnetic disk device according to claim 3, wherein the controller is configured to perform the division of the predetermined track into the divided areas such that a difference between a maximum value and a minimum value of the guaranteed number of times in each of the divided areas is minimized.

8. The magnetic disk device according to claim 4, wherein the controller is configured to perform the division of the predetermined track into the divided areas such that a difference between a maximum value and a minimum value of the guaranteed number of times in each of the divided areas is minimized.

9. A control method implemented by a magnetic disk device, the magnetic disk device including: a magnetic disk on which tracks are provided; a magnetic head to read/write data from/to the tracks; a memory to store, for each of divided areas of a predetermined track out of the tracks, a counter storing a numerical value and a counter threshold being a threshold value of the counter set on the basis of a guaranteed number of times of data readout, the guaranteed number of times corresponding to an adjacent track interference characteristic for each of the areas; and a controller, the control method comprising:

incrementing, by the controller, the counter when writing to an adjacent track is executed;

when a numerical value of the counter reaches the counter threshold, executing, by the controller, refresh to rewrite data or execute reading for determining whether or not to perform the refresh;

storing, in the memory, weights individually set for subdivided areas of the corresponding divided area, the weights each having magnitude inversely proportional to a guaranteed number of times of data readout; and performing, by the controller, processing for each of the divided areas, the processing including, when writing to an adjacent track of one or more of the subdivided areas is executed, multiplying a number of times of writing by the weight corresponding to the one or more of the subdivided areas and add the number of times of writing to the counter, and, when a numerical value of the counter reaches the counter threshold, executing the refresh or executing the reading for determining whether or not to perform the refresh.

10. The control method according to claim 9, further comprising dividing, by the controller, the predetermined track into the divided areas on the basis of a guaranteed number of times of data readout, the guaranteed number of times corresponding to an adjacent track interference characteristic for each area of the magnetic disk.

11. The control method according to claim 9, further comprising determining, by the controller, magnitude of each of the weights on the basis of a guaranteed number of times of data readout, the guaranteed number of times corresponding to an adjacent track interference characteristic for each area of the magnetic disk.

12. The control method according to claim 10, wherein the dividing of the predetermined track into the divided areas by the controller is performed such that a difference between a maximum value and a minimum value of the guaranteed number of times in each of the divided areas is minimized.

* * * * *